United States Patent
Pasquale (10) Patent No.: US 9,636,771 B2
(45) Date of Patent: May 2, 2017

(54) ELECTROMAGNETIC PULSE—WELDING DEVICE FOR WELDING METAL SHEET, COMPRISING A COOLING INSULATOR

(75) Inventor: Pablo Pasquale, Alzenau (DE)

(73) Assignee: PST Products GmbH, Alzenau (DE)

( * ) Notice: Subject to any disclaimer, the term of this patent is extended or adjusted under 35 U.S.C. 154(b) by 639 days.

(21) Appl. No.: 13/983,376

(22) PCT Filed: Feb. 2, 2012

(86) PCT No.: PCT/DE2012/000081
§ 371 (c)(1),
(2), (4) Date: Aug. 2, 2013

(87) PCT Pub. No.: WO2012/103873
PCT Pub. Date: Aug. 9, 2012

(65) Prior Publication Data
US 2013/0299487 A1    Nov. 14, 2013

(30) Foreign Application Priority Data
Feb. 3, 2011    (DE) .................. 10 2011 010 216

(51) Int. Cl.
*H05B 6/36* (2006.01)
*B23K 13/01* (2006.01)
(Continued)

(52) U.S. Cl.
CPC .............. *B23K 20/06* (2013.01); *B23K 13/01* (2013.01); *H05B 6/36* (2013.01); *H05B 6/42* (2013.01)

(58) Field of Classification Search
CPC .......... B23K 13/01; B23K 20/06; H05B 6/42; H05B 6/36
(Continued)

(56) References Cited

U.S. PATENT DOCUMENTS 3,284,678 A * 11/1966 McBride ................. H01L 23/26
                                                              257/687
3,851,139 A * 11/1974 Rudd .................... B21D 26/14
                                                              219/101

(Continued)

FOREIGN PATENT DOCUMENTS

JP    2004-342535    12/2004
JP    2008-55505    3/2008
(Continued)

OTHER PUBLICATIONS

Aizawa Tomokatsu, Tabular coil for electromagnetic seam welding, Dec. 2, 2004, Machine Translation of JP 2004342535A.*
(Continued)

*Primary Examiner* — Quang Van
(74) *Attorney, Agent, or Firm* — Westman, Champlin & Koehler, P.A.

(57) ABSTRACT

The invention relates to an electromagnetic pulse-welding device for joining a metal sheet to a metal part, consisting of an electric energy source which is connected to a coil by means of a current conductor, the active part of said coil being in the direct proximity of the metal sheet, said metal sheet being at a distance from the metal part. The passive part of the coil has a larger cross-section than the active part and said active part borders on one part of the surface in a positive fit, to a cooling insulator, the material having a relatively high thermal conductivity and a relatively low magnetic and electric conductivity compared to the material of the coil.

16 Claims, 3 Drawing Sheets

(51) Int. Cl.
*B23K 20/06* (2006.01)
*H05B 6/42* (2006.01)

(58) Field of Classification Search
USPC ............... 219/603, 602, 607, 608, 610, 611,
219/614–616, 659, 617, 101, 149, 152,
219/153, 59.1, 61.2, 67; 228/114.5, 232,
228/262.5; 285/288.1, 21.2, 41; 257/687
See application file for complete search history.

(56) References Cited

U.S. PATENT DOCUMENTS

2003/0197007 A1 10/2003 Kim et al.
2006/0175310 A1 8/2006 Fujimoto et al.

FOREIGN PATENT DOCUMENTS

JP 2010110814 A * 5/2010
WO WO 97/48515 12/1997

OTHER PUBLICATIONS

Database WPI, Week 200937, Thomson Scientific, London, GB; AN 2009-J88689 XP002679269, -& JP 2009 123542 A (Dokuritsu Gyosei Hojin Rikagaku Kenkysh) Jun. 4, 2009 (Jun. 4, 2009) Zusammenfassung; Abbildungen, 2 pages.
International Search Report from PCT/DE2012/00081, dated Jul. 17, 2012.

* cited by examiner

ELECTROMAGNETIC PULSE—WELDING DEVICE FOR WELDING METAL SHEET, COMPRISING A COOLING INSULATOR

CROSS-REFERENCE TO RELATED APPLICATION

This Application is a Section 371 National Stage Application of International Application No. PCT/PCT/DE2012/000081, filed Feb. 2, 2012 and published as WO 2012/103873 on Aug. 9, 2012, not in English, the contents of which are hereby incorporated by reference in their entirety.

The invention relates to an electromagnetic pulse-welding device for bonding a metal sheet to a metal part, comprising an electrical energy source, which is connected via an electrical conductor to a coil, the active part of which extends in the immediate vicinity of the metal sheet, the metal sheet being spaced from the metal part.

In the prior art, it is known under the term "explosion welding", that a metal sheet, in order to connect it to a further metal part, strikes via a strip-like portion of the surfaces thereof onto the metal part, specifically at an acute angle and at a velocity of at least 100 m/s, that is to say at least 360 km/h.

A further feature of the method is that the sheet metal, before welding, is located at a small distance from the metal part, which distance serves as acceleration path. In the process, the air located between the metal parts is strongly accelerated and compressed, acting almost like a solid tool that scrapes the oxide layers from the surface of the metal parts.

In the process, pure metal surfaces come into contact with one another and deform plastically until they approach one another to atomic distances, so that lattice forces come into effect, which weld them together.

In a method known in the prior art, the detonation of an explosive charge serves to generate the pressure. For connecting two metal plates that lie horizontally one on top of the other, a uniform thin layer of explosive is laid on the surface of the upper metal plate, which faces away from the surface to be joined. A plate that is relatively heavy relative to the explosive force is laid on this explosive charge layer. Then the explosive charge layer is ignited with an electric detonator is ignited at a point on the edge or in the centre and caused to detonate. A pressure wave occurs, which propagates along a front on the metal plate.

Due to the massive upper cover, the pressure wave cannot escape freely upwards, but "strikes" the metal plate located below the explosive layer onto the second metal plate, or the metal body, which is located below it.

As a result of the mass inertia, however, the upper metal plate does not move as a whole but only deflects the sheet metal section lying below the detonation zone somewhat and strikes on the base sheet.

In the prior art, it is known, instead of the explosive, for partial acceleration of the metal sheet, to use a coil and a magnetic field generated thereby by means of an electromagnetic pulse. To this end, the electrical coil is disposed in the vicinity of the sheet metal to be welded on and a very high current flows through it in a pulsed manner. This current generates a first magnetic field, which produces eddy currents in the metal plate. These eddy currents in turn create a second magnetic field, which is opposite in direction to the first magnetic field, so that the two magnetic fields mutually repel one another. Finally, a very high force is briefly exerted onto the first metal plate, deforming it partially, accelerating it and causing it to strike on the second metal plate.

Patent JP 2008 055 505 shows a coil that is suitable for this. In principle, it consists of a rectangular metal plate, into which two mutually parallel slits are cut from one edge. By this means, the metal plate is given the form of the letter E. The centre leg of the E is connected to one pole of the current source, and the two outer legs are connected parallel to one another and coupled to the other pole of the current source. The current flows through the centre leg into the coil and out again through the two outer legs. By this means, a magnetic field develops, which has its greatest field intensity in the region of the centre leg. The centre leg of the E-shaped coil is therefore disposed parallel to and at a small distance from the region of the metal sheet to be welded.

The biggest disadvantage so far is that, in practice, the currently known coils only have a relatively short lifetime, since they have to apply the counter forces necessary for accelerating and deforming the metal plate, and also are strongly heated due to the voltage drop at their ohmic resistance.

A further disadvantage is that, due to the large current pulse, the coil in itself is loaded. The two outer legs of the E-shaped coil attract one another mutually, since current flows through them in the same direction. But they are repelled by the centre leg, since the current therein flows in the opposite direction. Since these two effects do not completely cancel one another out, the legs are subjected to a torque with respect to that portion of the coil that runs perpendicular thereto, which connects the legs, which torque, after a large number of applications, leads to breaking off of the legs.

A further disadvantage occurs due to the fact that the centre leg is advantageously relatively narrow, so that, in this region, a particularly high current density, and therefore a particularly high magnetic field intensity is achieved. This results in a relatively high ohmic resistance of the centre leg, for which reason the thermal loading of this portion of the coil is highest. In this loaded zone, premature fracture of the coil is therefore threatened.

Against this background it is the object of the invention to create a coil for electromagnetic pulse welding of metal sheets to other metal parts, which can be more highly loaded than coils of the prior art, and nevertheless a higher lifetime can be expected.

As a solution, the invention provides that the passive part of the coil has a larger cross-section than the active part and the active part, at a portion of its surface, is adjacent to, in interlocking connection with, a cooling insulator, of which the material has a relatively high thermal conductivity in comparison to the material of the coil and a relatively low magnetic and electrical conductivity.

For welding a metal plate to a metal part, a large current pulse flows through the coil, at least one capacitor bank being used as current source in practice. By this means, a strong, punctiform or linear magnetic field is built up, which induces eddy currents in the metal sheet. The counterforce generated thereby generates such a high pressure that a punctiform or linear region of the metal plate is repelled by the coil and accelerated to a very high velocity.

In tests, velocities of a metal sheet region of up to 720 meters per second, corresponding to 2,600 kilometers per hour, were achieved in the range of the highest magnetic field intensity of an electrical coil. At such high velocities, the adjacent regions of the metal sheet, because of their mass inertia, are not accelerated to the same velocity but deformed. The mass inertia of those regions of the sheet metal that are even more remote restricts the deformation of the sheet metal to a strip-shaped region in each case, within which the sheet metal is deformed to form an approximately S-shaped profile. Corresponding to the build-up of the magnetic field, this deformation propagates to an S along a front line over the surface.

The S-shaped front-line of the sheet metal, which moves with such high velocity, collides abruptly against the metal part.

In the process, the air located between the metal parts is so strongly accelerated and compressed that it can even reach supersonic speed, which leads to the well-known supersonic boom. The topmost atomic layers of the sheet metal and the metal part, and therefore the oxide skins located on each metal surface are accelerated at high speed from the space between the sheet metal and metal part.

The two boundary layers of the metal part and the metal sheet evade the pressure and briefly flow like a fluid in the detonation direction, the grain boundaries remaining largely retained. The layers close to the boundary are alternately piled up and pushed together, so that a wavelike bonding zone is produced. Its wavefronts always run perpendicular to the propagation direction of the collision process, in a similar way to waves, which are triggered by a stone incident on the water surface. The wave pattern in the bonding zone is similar to the ribs oriented transversely to the flow direction, which are formed in a sandy beach by water draining away.

In a similar way to waves in water, the waves in the metal boundary surface can be superimposed on one another or even roll up. Only when the eddy in front of the wave crest becomes too strong can melting or intermetallide formation occur there.

As a result, during striking of the sheet metal on a metal part located below it, lattice forces become active in the mutually incident atoms, which—as described above for "explosion welding" —weld the metal sheet to the metal part.

Because the connection is predominantly effected by the briefly high pressure, the melting point of the metals involved is only reached in a very shallow zone along the connecting surface. Its depth in practice is usually only 0.5 to 5 µm.

By means of a very fast heat dissipation from this zone into the metal environment, the microstructure and grain structure of the metal are retained. Unlike conventional fusion welding, with a comparatively very large fluidization zone, during solidification after the welding according to the invention, an extremely fine-grained microstructure is produced, possessing both high strength and high ductility.

Therefore, unlike fusion welding, no mixing of the two metals to be connected occurs either, which, with a range of metal combinations, results in the formation of brittle intermetallic phases.

With a pulse welding device according to the invention, very uniform and load-bearing welds can be achieved, in particular of two metals with very different melting points. For example, aluminium sheets can be welded onto steel girders, or else copper and titanium can be connected together.

In the case of a coil according to the invention, the size of the current-conducting cross-section distinguishes very clearly between the so-called "passive part" of the coil—below which no welding occurs—and the so-called "active part" of the coil—below which the welding takes place. In the active part, the current is "crowded together" through a considerably smaller cross-section onto a relatively very small surface, as a result of which very reliable and efficient welding is achieved below this surface.

On the other hand, below the passive part, due to its very much larger cross-section, the magnetic field intensity is so low that, in this region of the metal sheet, only a very much smaller or negligible degree of eddy currents is generated, so that the metal sheet in this region is not significantly accelerated and deformed.

The extremely desirable effect, of the magnetic field being virtually exclusively concentrated on the active part, would, in the case of a design of the coil according to the prior art as a so-called "air coil" without further insulation or support, lead to the active part breaking after a relatively small number of applications in the case of exertion of the mechanical counterforce during pulse welding.

If the current density in the active part is to be further increased, in order to even further intensify the magnetic field generated thereby, the active part could be heated to such a great extent that it melts.

This effect is known in principle from a fuse circuit breaker. Just like the active part of the coil according to the invention, the fuse wire of a fuse circuit breaker, too, has a considerably lower cross-section than the other portions of the current guide. Unlike a coil for electromagnetic pulse welding, however, a fuse circuit breaker is deliberately provided as a consumable part.

It is a principle idea of the invention to safeguard the active part of the coil against these loads by bringing the active part into contact with at least one cooling insulator. As its name suggestions, it saves both to dissipate the waste heat occurring on the active part, as well as to insulate it. It therefore has high thermal conductivity and low electrical conductivity.

A further function of the cooling insulator, which is not included in its name, is mechanical support of the active part. In the case in which the coil is designed as an E-shaped coil, the cooling insulator, for example, prevents the active part and the passive part from coming into contact with one another.

Boron nitride has proved a particularly suitable material for the cooling insulator. Boron nitride, chemical formula BN, is a boron-nitrogen compound, which occurs in the two stable modifications α-BN and β-BN. Its thermal conductivity is about five times higher than that of copper. Despite this, boron nitride only has a relatively very low magnetic and electrical conductivity.

The principle of partial contact of a cooling insulator against the active part of a coil for electromagnetic pulse welding of metal sheets can be applied to different shapes of coils.

One example is the E-shaped coil already mentioned above as the prior art. It consists of an elongated profile as active part, which is flanked by a passive part in each case on two opposite longitudinal sides. Both passive parts extend parallel to and at a distance from the active part. The cooling insulator according to the invention, in this case, is inserted into the two interspaces between the active part and the two passive parts and is in areal contact with both parts.

A further appropriate design of a coil for electromagnetic pulse welding is a double-winding coil, that is to say a coil with two windings. A particularly interesting embodiment here is one in which all parts of the coil, with the exception of a conductor loop for connecting the two windings in one plane, thus consist of a plate.

In this embodiment, the active parts of both windings are arranged parallel to and at a distance from one another. On the surface lying opposite the air space between the two active parts, there is a cooling insulator in each case, against the opposite surface of which there bears the passive part of each winding. Each winding of this two-winding coil thus corresponds to one half of the above-described E-shaped coil.

The advantage of such a two-winding coil is that the current density and therefore the magnetic field intensity is almost doubled with respect to a single-winding coil. Such an embodiment could not be operated without supporting of the active part by means of a cooling insulator in each case, but would be destroyed already with the first current pulse.

A further very interesting embodiment of a coil according to the invention is a so-called "hammer coil". This designation can derived from its geometrical shape, in which the "handle" of the hammer is formed by two passive parts, which mostly run parallel to one another and are mostly plate-shaped, against which a narrow active part bears, oriented transversely thereto, at one end, which projects in the transverse direction beyond the two plate-shaped passive parts and thus forms the head of the hammer coil.

Unlike the one and two-winding coils described above, such a hammer coil cannot be cut efficiently from one material plate. Instead, an interesting embodiment consists of an elongated narrow metal profile as active part, from which a short end section in each case at the two ends is angled over, which is, in each case, connected to a passive part. The two end sections are in each case oriented parallel to one another. Expediently, the cross-section of the active part is considerably smaller than the cross-section of the two passive parts so that the magnetic field is concentrated on the region of the active part. This results in an extremely high current density in the active part, which does not immediately melt the active part only if the latter is contiguous, via two surfaces that lie parallel to one another, with a cooling insulator in each case.

To connect these cooling insulators permanently and durably to the active part, the invention proposes that a continuous metal strip runs around the outer sides of the two cooling insulators, or another pressing device lies on the free, mutually parallel surfaces of the two cooling insulators.

To achieve a low-resistance transition of the current from the active part into the passive parts, the invention proposes fastening an end section in each case in a groove in the large surface of one plate-shaped passive part.

The loading of a coil according to the invention during a welding operation is further reduced by the fact that, in the region of the transition from the active part to the passive part, at least the inner edges, ideally also the entire surfaces are continually rounded. It is achieved thereby that, with the transition from the active part to the passive part, the current density falls continuously, not suddenly, to avoid thermal and mechanical "predetermined breaking points".

As already repeatedly mentioned, it is absolutely necessary for the welding process according to the invention that, before welding of the second metal part, the metal sheet has a certain small distance, so that, on activation of the electrical field, acceleration can take place beyond this distance and strikes on the other metal part with a relatively high velocity and at an acute angle. In practice, a distance of the order of 0.3 to 10 mm has proven suitable in very many cases.

Experiment show that the best results were found when the impact did not take place perpendicular to the surface but, very briefly before the impact, the sheet metal was deformed to the extent that an angle of about 2 to 30 degrees was established between the two surfaces. Only with an "obliquely directed" collision of this kind was the desired plastic deformation of the materials and a sturdy connection achieved.

By means of a corresponding selection of the distance of the two metal sheets from one another and the shaping of the coil and the current intensity flowing through it, a particular collision angle of between about 2° and 30° is established. Then, on impact of the accelerated sheet-metal section onto the metal part located below it, the introduced energy is transformed into such a high compressive tension that both metals, in an otherwise cold state, are plastically deformable within a very thin boundary layer.

To ensure that the suitable distance before welding is maintained, in the simplest case, corresponding stops for the two parts that are to be welded to one another, or spacer pieces, are used.

So that the distance does not have to be readjusted each time or corresponding spacers need to be used, the invention proposes, as an alternative, forming at least one bulge and/or elongated bead in the sheet metal to be welded, of which the elevation above the adjacent regions of the sheet-metal surface corresponds to the distance between the metal sheet and metal part that is necessary for welding.

As a first embodiment, the invention describes disposing the bulge or the bead in the centre of that region of the metal sheet that is to be welded. Then the active part of the coil is arranged such that the pressure wave and therefore the S-shaped deformation of the sheet-metal propagates from this bead. It is thereby achieved that the surface welded to one another extends around the bulge or on both sides of the bead.

It must be accepted that, at a point in the centre or along a line in the centre of the welded surface, the two metal parts are not connected together, since a very high quality welded surface extends on both sides of this point or this line.

In a second alternative embodiment, the invention proposes that a row of bulges, which are spaced from one another, is arranged at the edge of that area of the metal sheet that is to be welded. Then the welding should start in the centre between these bulges and, in the course of welding, extend as far as the bulges. Ideally, then, even the bulges are integrated into the welded surface and are subsequently no longer recognizable as such.

The advantage of the spacing between the bulges is that the pressure wave created on impact of the metal sheet and the beginning of its deformation can propagate through between the bulges and therefore has sufficient free space to allow the oxide layers on the surfaces of both metal parts that are removed by the pressure wave to be blown away.

As has already been repeatedly explained, a characteristic of the welding according to the invention is that, due to the welded-on sheet metal plate, an S-shaped deformation propagates from the centre of the region to be welded as far as the edge of the weld region. This S-shaped profile at the edge of the welded region can be recognised as a depression on the opposite, non-welded side of the metal sheet.

If the demand is made that a depression of this kind should not remain after welding, it is conceivable before welding to introduce into the metal sheet a bulge and/or bead that is upwardly directed away from the counterpiece and is complementary to that deformation of the metal sheet that would become established in a previously flat metal sheet after welding. Due to the deformation during welding, this outwardly rising-up bulge is "smoothed" again, so that a flat surface is generated again in the end result.

It should be noted that, with a configuration of the bulge or bead of this kind, those regions of the metal sheet that are not to be welded to the second metal part lie directly, and without spacing, thereon, so that the pressure wave created during welding might not be able to dissipate to the full extent.

Because the removal of the metal oxide layer might be hindered thereby, the invention proposes, as an alternative refinement, that the convex bulge or bead has some relatively small notches in its edge region, though which the pressure wave can escape.

A further improvement can be achieved in that the bulge and/or bead that was previously impressed into the sheet metal is somewhat narrower than the region that is to be welded, so that the welding operation itself "flattens" the bulge or bead again.

For pulse welding with a previously formed bulge or bead in the metal sheet, it is conceivable that the pulse welding device additionally also performs the impression of the bulge or the bead, so that the metal sheet only needs to be inserted or clamped once into a machine specialized for this purpose. The invention proposes for this purpose an embodiment of the device in which the metal sheet to be welded only needs to be inserted or clamped a single time into a suitable receiver. Then, in a first processing step, e.g. by means of electromagnetic pulse joining, in or on the region to be welded, a bulge and/or a bead is formed in. In a second processing step, this region of the metal sheet is welded to a metal part.

The advantage of such a double device is the saving of working time and the gain in quality reliability due to the avoidance of a processing step.

Further details and features of the invention are explained below in greater detail with reference to three examples. However, they are not intended to limit the invention but only explain it. In diagrammatic view.

Figure 1:
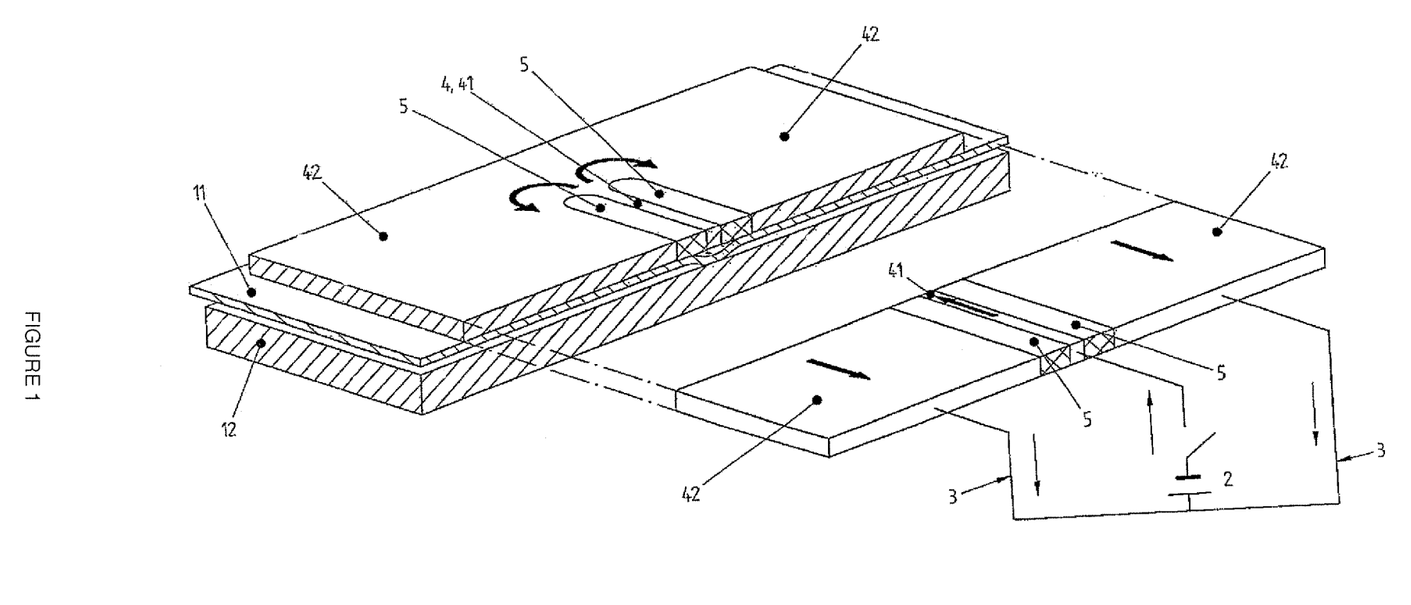
FIG. 1 shows a section through a single-winding coil with two metal sheets welded together

FIG. 1 shows a single-winding coil in the form of an E in the oblique view, cutaway transversely to the three legs of the E. The section is continued through the metal sheets 11 which are disposed below and are to be welded together, and the metal part 12 which is located below.

In the right-hand part of coil 4, which is cutaway in the drawing, the active part 41 can be seen in the centre. It is contiguous with two mutually opposite outer surfaces of a cooling insulator 5 in each case, which is marked by means of a cross-hatched end face. A passive part 42 of the coil 4 is contiguous with the two other surfaces of each cooling insulator 5.

In FIG. 1, the arrows show how the electrical current flows from the energy source 2 through the coil 4: when the switch is closed, the current flows into the active part 41 and then through that part of coil 4 that is cut out in the drawing and is therefore not visible, into the region shown at the top.

In FIG. 1, it can be very readily seen that, when the current emerges from the active part 41, it branches and one part of the current flows further into the left-hand passive part 42 of the coil 4 and the other part of the current flows into the passive part 42 of the coil 4 that is shown at the right.

The current flows back into the electrical conductor 3 through those sections of the passive parts 42 of the coil 4 that are cut out in FIG. 1, and therefore are not visible, until the energy source 2 closes again.

In FIG. 1, it is thus visible that the current flows in a left-hand and a right-hand electrical circuit. Since the two electrical circuits, however, are superimposed in the active part 41 in the centre of coil 4, such a coil is designated a "one-winding" coil.

In FIG. 1, however, it can very readily be seen that the current density in the active part 41 is considerably greater than in the two passive parts 42. To achieve this, only the cross-sectional area of the active part 41 must be compared with the sum of the cross-sectional areas of the two passive parts 42. From FIG. 1, it can be seen that the cross-sectional area of the active part 41 is only about a tenth of the cross-sectional area of both passive parts 42. From this, it follows that the current density in the active part 41 is about ten times greater than the current density in the two passive parts 42.

This ratio also explains again the designation of the centre leg of the coil as "active part", because the current density here, and therefore also the magnetic field intensity per unit area of the sheet metal to be welded, are ten times greater than in the vicinity of the passive parts. From this, it follows that, only below the active part 41, are such high force exerted on the metal sheet 11 that it is suddenly caused to bulge out downwardly in the direction of the metal part 12.

In FIG. 1, it can be clearly seen that the "bulged out" region of the metal sheet 11, on its way from the flat state of the metal sheet 12, has been continually accelerated downwards for striking onto the metal part 12, and therefore impacted with a high velocity onto the sheet-metal part 12.

In FIG. 1, the principle inventive feature of the invention, namely the cooling insulation 5 between the active part 41 and the two passive parts 42 of the coil 4 can be very clearly seen. It is understandable that the cooling insulator 5 lies on a large portion of the surface of the active part 41, and is in contact with the passive part 42 with just as large a proportion of its surface area.

Since the cooling insulator 5 is a good electrical insulator, but a very good thermal conductor, it can be seen in FIG. 1 how the lost heat flows from the active part 41, via the two flanking cooling insulators 5, into the adjacent passive parts 42. It is to be noted here that, in the active part 41, the current density is about ten times higher than in the two passive parts 42. The heat loss at the ohmic resistance of the active part 41 is therefore greater to the same degree as in the passive parts and the temperature gradient from the active part 41 to the two passive parts 42 is correspondingly large.

In FIG. 1, a further function of the two cooling insulators 5 can also be seen, namely the mechanical support of the active part 41. Again, due to its relatively thin cross-section, the active part 41 is mechanically by no means so highly load bearing as the two passive parts 42.

In FIG. 1, it can be readily understood that, on deformation of the metal sheet 12, a downwardly directed force is exerted onto the sheet metal. A counter force of equal magnitude, which is thus upwardly directed, acts on the active part 41 of the coil 4. The comparison of the cross-sections of the active part 41 and the two passive parts 42 shows that the active part 41 of this force can provide a much lower opposing resistance than the two passive parts 42. It is therefore a highly welcome function of the two cooling insulators 5 that they transmit a part of this approximately vertically acting force onto the two considerably more load-resistant passive parts 42.

Figure 2:
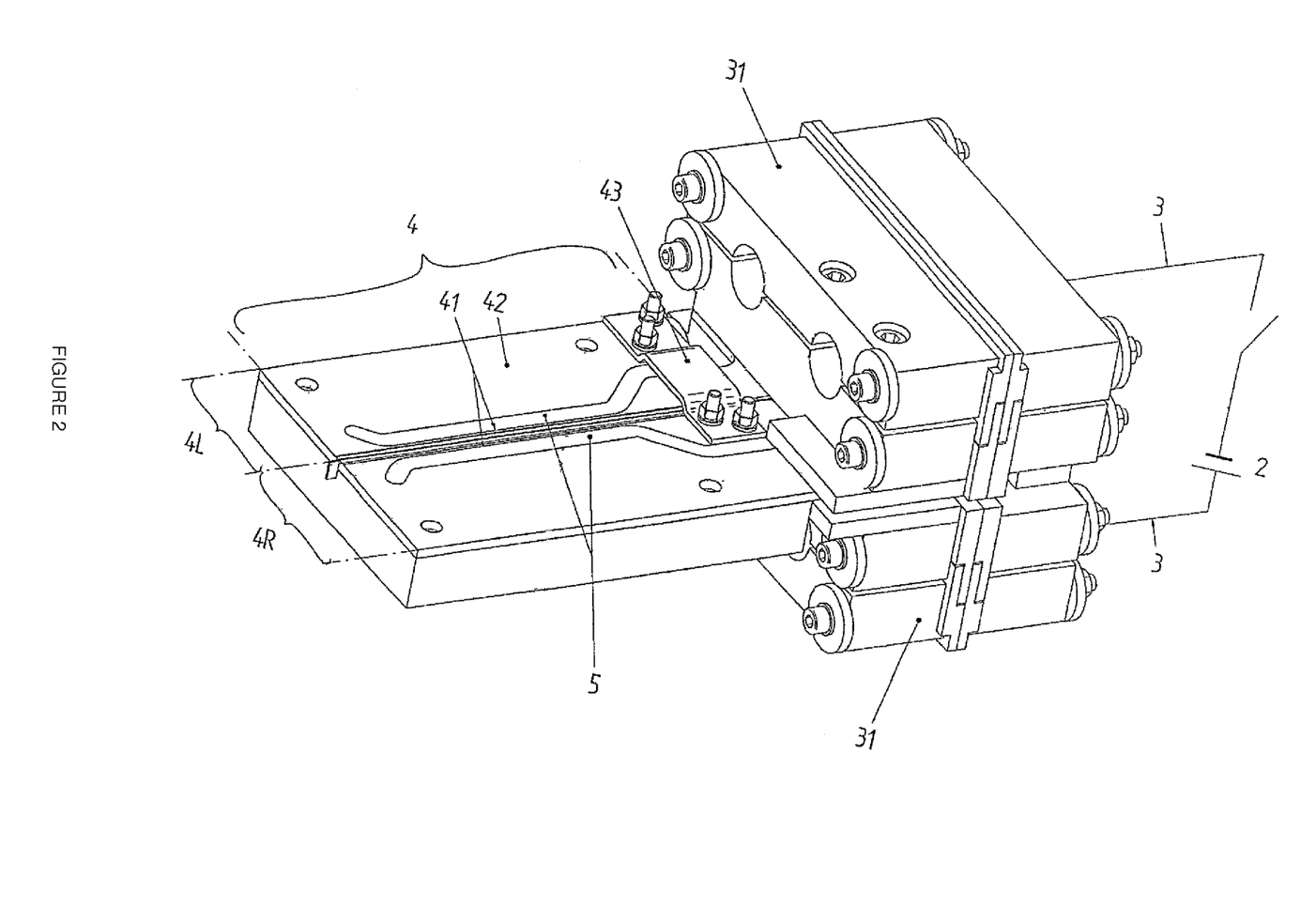
FIG. 2 shows an oblique view of a two-winding coil

FIG. 2 shows a coil according to the invention in the embodiment as a so-called "two-winding" coil 4 in vanishing-point perspective. In the left half, the two windings 4 L and 4 R of the coil 4 can be seen. It is clear that, from this coil 4, only the current loop 43 for connecting the left-hand partial winding 4 L and the right-hand partial winding 4 R projects beyond the plane of the windings.

In FIG. 2, it rapidly becomes clear how the current flows below the current loop 43 into the left-hand partial winding 4 L of the coil. From the current conductor 3, it enters the coil 4 via the connection block 31. Shortly after it enters, it must allow the considerably lower cross-section of the active part 41 to "crowd together". It then flows with a relatively high current density through the relatively very slender first active part 41, which runs parallel to a first cooling insulator 5, with which it is areally contiguous.

At its left end, the cross-section of the active part 41 enlarges significantly and merges into a first passive part 42, the cross-section of which is about ten times larger than that of the active part. The current density is therefore reduced correspondingly.

From the first passive part 42 of the left-hand partial winding 4 L the current flows through the current loop 43, via the input line, into the right-hand partial winding 4 R of the coil 4. Here, too, the profile of the second active part 41 tapers very dramatically with respect to the entry region. At the end of the second active part 41, the current also passes in the right-hand partial coil 4 R continuously into the considerably larger cross-section of the second passive part 42.

This large cross-section is connected to the energy source 2 via the connection block 31 and the current conductor 3.

FIG. 2 shows the coil 4 and the two connection blocks 31 for the two current conductors 3 in a realistic embodiment. The large cylindrical openings which can be recognised in the two screw terminal blocks 31 make it clear what considerable cross-sections are necessary for the current conductor 3, since a very high peak current flows during electromagnetic pulse welding. For the sake of clarity, the current conductors 3 as well as the voltage source 2 are represented symbolically only as a block circuit diagram. In FIG. 2, it is clear that the current flows twice through the active region of coil 4, namely through the two active parts 41 of the two partial coils 4 L and 4 R. It is plausible that, thereby, the current density is approximately doubled with respect to a single-winding coil. In FIG. 2, however, it is also very impressively visible that an extremely small cross-section of the active parts is necessary for this purpose. Without the cooling insulators contiguous with the active part, the active parts would therefore break and even melt.

FIG. 2, shows that it is very readily plausible that the cooling insulators 5 additionally also serve as a mechanical support of the active parts 41 on the passive parts 42.

Figure 3:
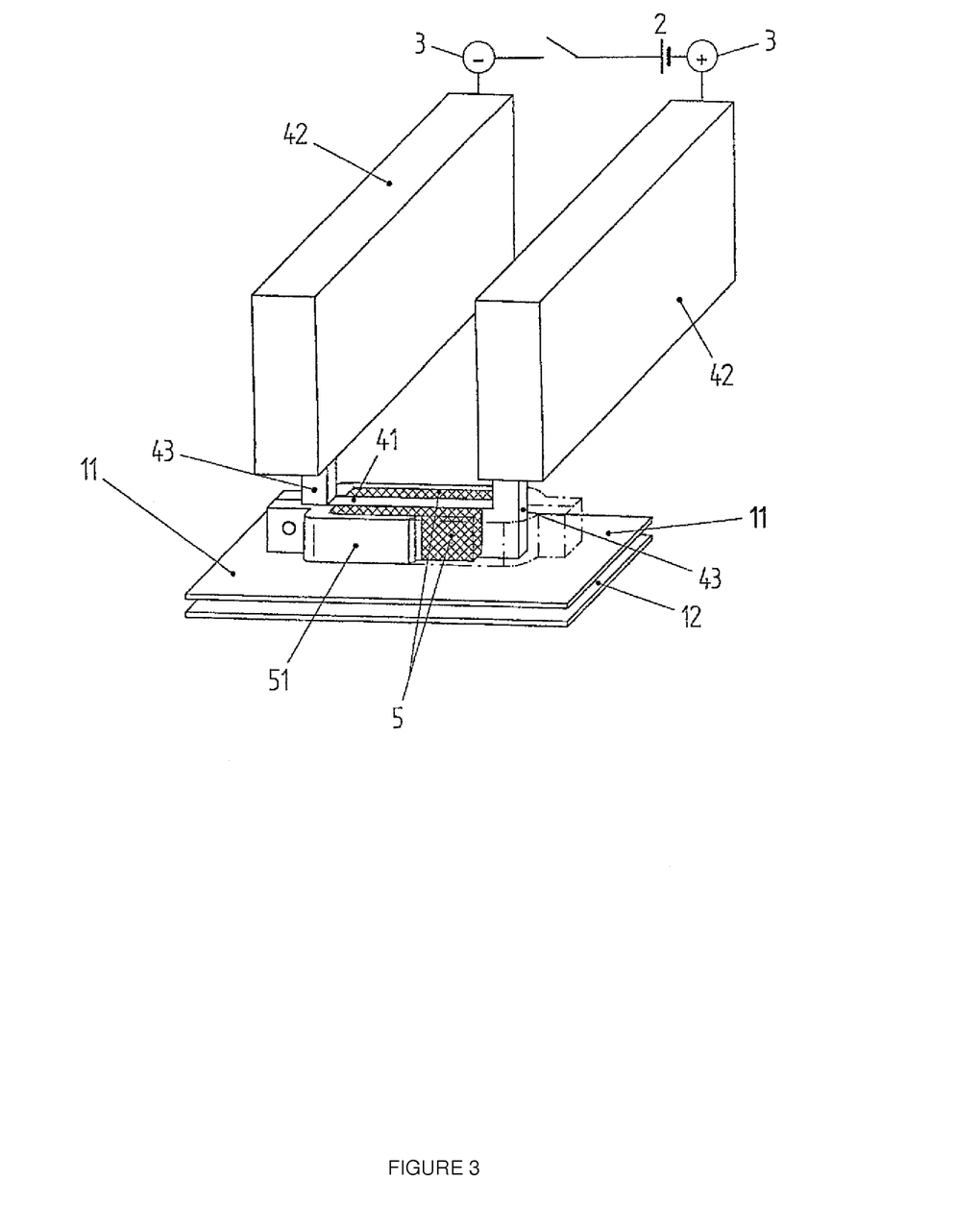
FIG. 3 shows a schematic view of a "hammer coil"

In FIG. 3, as a perspective schematic diagram, the basic structure of a so-called "hammer coil" is drawn and a metal sheet 11, which is to be welded to the metal part 12 below the active part 41. It can very readily be seen that, to this end, the two metal parts 11, 12 are spaced from one another.

In this embodiment, the two passive parts 42 are two plates in each case, which are oriented parallel to one another and with a spacing from one another. In practice, they are supported on one another with insulation elements—which are not drawn here. At their front end, these two passive parts 42 are connected together by means of the two perpendicular, upwardly angled end sections 43 of the active part 41.

The horizontal active part 41, together with the two end sections 43, forms a loop-shaped current guide, the current-carrying cross-section of which is considerably smaller than the current-conducting cross-section of the two passive parts 42.

In the embodiment according to the Figure, one cooling insulator 5 in each case is contiguous at both sides of the active part 41, the active part 41 and cooling insulators 5 being in areal contact. To hold together the two cooling insulator 5 on both sides of the active part 41, in FIG. 3, a pressure device 51 is drawn running around the two cooling insulators. Only that part that can be seen at the left front is completely represented, of the rest, only the outlines are marked with a dotted line.

In this embodiment, the pressure device 51 consists of two approximately U-shaped metal parts, which are pressed areally against the two cooling insulators 5. Of this, only half of the front pressure loop is shown. At the left, it can be seen how one half of the pressure device 51 can be connected via a screw union to the other half of the pressure device 51. For the sake of clarity, the right-hand halves of the front pressure loop and the rear pressure loop are only marked by dotted outlines, so that, of the pressure device 51, only a quarter can be seen in FIG. 3 as a part that is broken out in the drawing.

As in FIGS. 1 and 2, the current conductors 3 and the energy source 2 and the switch for the activation thereof are only drawn as a block circuit diagram in non-perspective view.

LIST OF REFERENCE CHARACTERS

11 Metal sheet, workpiece, to be welded to metal part 12
12 Metal part, workpiece to be welded to metal sheet 11
2 Current source, delivers current pulse into the coil 4
3 Current conductor connects current source 2 to coil 4
31 Connection block, connects current conductor 3 to coil 4
4 Coil
41 Active parts of coil 4, with very high current density, effect welding of the metal sheet 11
42 Passive parts of the coil 4 with low current density
43 Current loop, bridges the feed line, in the case of multiloop coils, to form a partial coil
4L Left partial winding of a two-winding coil
4R Right partial winding of a two-winding coil
5 Cooling insulator, cools, insulates and stabilizes the active part 41

The invention claimed is:
1. An electromagnetic pulse welding device for bonding a metal sheet to a metal part comprising:
  an electrical energy source,
  a coil having an active part extending in the direct vicinity of the metal sheet, the metal sheet being spaced from the metal part and a passive part having a larger cross-section than the active part, wherein the active part is in areal contact with an insulator comprising a material having a lower magnetic and electrical conductivity than a material of the coil, and
  a current conductor electrically coupling the electrical energy source to the coil,
  wherein:
    the insulator is a cooling insulator in that the material of the insulator has a higher thermal conductivity than the material of the coil,
    a portion of the passive part is in areal contact with the cooling insulator, and
    an area of contact between the active part and the cooling insulator, and an area of contact between the passive part and the cooling insulator are substantially equal in size.
2. The device according to claim 1, wherein the cooling insulator comprises boron nitride.

3. The device according to claim 1, wherein the active part has an elongated profile, and the passive part includes first and second passive parts, which are positioned on opposing longitudinal sides of the active part, each of the first and second passive parts is disposed parallel to and displaced a distance from the active part, wherein a cooling insulator fills a space between the first and second passive parts and the active part.

4. The device according to claim 1, wherein:
a two-winding coil runs in a plane, with the exception of a current loop for connecting the two windings together, and
active parts of each of the two windings are arranged parallel to and at a distance from one another,
a cooling insulator is disposed between opposing surfaces of the active parts of the two windings, and
each of the two windings includes a passive part located on a surface that opposes the cooling insulator.

5. The device according to claim 1, wherein, at the coil, in the region of the transition from the active part to the passive part, the inner edges and/or the surfaces are continually rounded.

6. The device according to claim 1, wherein the distance between that region of the metal sheet that is to be welded and the metal part is approximately of the order of 0.3 to 1.0 millimeters.

7. The device according to claim 1, wherein into the metal sheet, at or close to the region to be welded, before the welding, there can be introduced at least one bulge and/or an elongated bead, the elevation of which above the adjacent regions of the sheet-metal surface corresponds to the distance, which is necessary for welding, between the metal sheet and the metal part.

8. The device according to claim 7, wherein the bulging or the bead is located in the centre of that region of the sheet metal that is to be welded.

9. The device according to claim 7, wherein a row of bulges, which are spaced from one another, are located at the edge of that region of the metal sheet that is to be welded.

10. The device according to claim 7, wherein the bulging and/or the bead is complementary to that deformation of the metal sheet that would be established after the welding of a metal sheet that was previously flat.

11. The device according to claim 7, wherein, before welding, the necessary bulges and/or the required beads can thereby also be formed into the metal sheet.

12. The device according to claim 11, wherein
each metal sheet then only needs to be inserted or clamped once
in a first processing step—e.g. by means of an electromagnetic pulse joining—on or on that region that is to be welded a bulge and/or a bead is formed in, and
in a second processing step, this region of the metal sheet is welded to a metal part.

13. The device according to claim 7, wherein it comprises a receptacle for insertion or clamping of a metal sheet,
in which of the metal sheet, in a first step, at least one bulge and/or at least one bead can be impressed and
in a second step, the metal sheet is at least partially welded to a metal part in the region of the bulge or bead.

14. An electromagnetic pulse welding device for bonding a metal sheet to a metal part comprising:
an electrical energy source,
a coil having an active part extending in the direct vicinity of the metal sheet, the metal sheet being spaced from the metal part and a passive part having a larger cross-section than the active part, wherein the active part is in areal contact with an insulator comprising a material having a lower magnetic and electrical conductivity than a material of the coil, and
a current conductor electrically coupling the electrical energy source to the coil,
wherein:
the insulator is a cooling insulator comprising a material having a higher thermal conductivity than the material of the coil,
the active part consists of an elongated profile, and
at both ends of this profile, a short end section is angled over and each end section is connected to a passive part,
the end sections being in each case oriented parallel to one another, and
surfaces of the active part that are parallel to the end sections are in areal contact with the cooling insulator.

15. The device according to claim 14, further comprising a continuous metal strip or a pressure device in areal contact with each of the first and second cooling insulators, wherein an area of contact between the active part and the corresponding cooling insulator is substantially equal in size to an area of contact between the cooling insulator and the metal strip or the pressure device.

16. The device according to claim 14, wherein an end section is fastened in a groove in the large surface of a plate-shaped passive part.

* * * * *